Oct. 21, 1924.                                           1,512,575
H. L. BLOOD
PLANER CONTROL SYSTEM
Original Filed Oct. 7, 1921
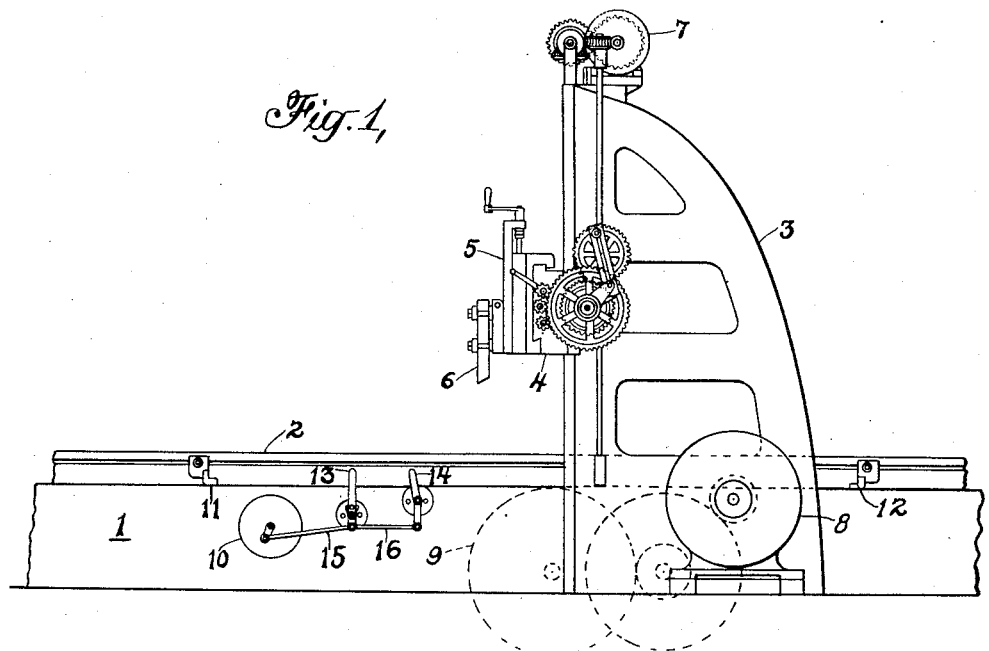
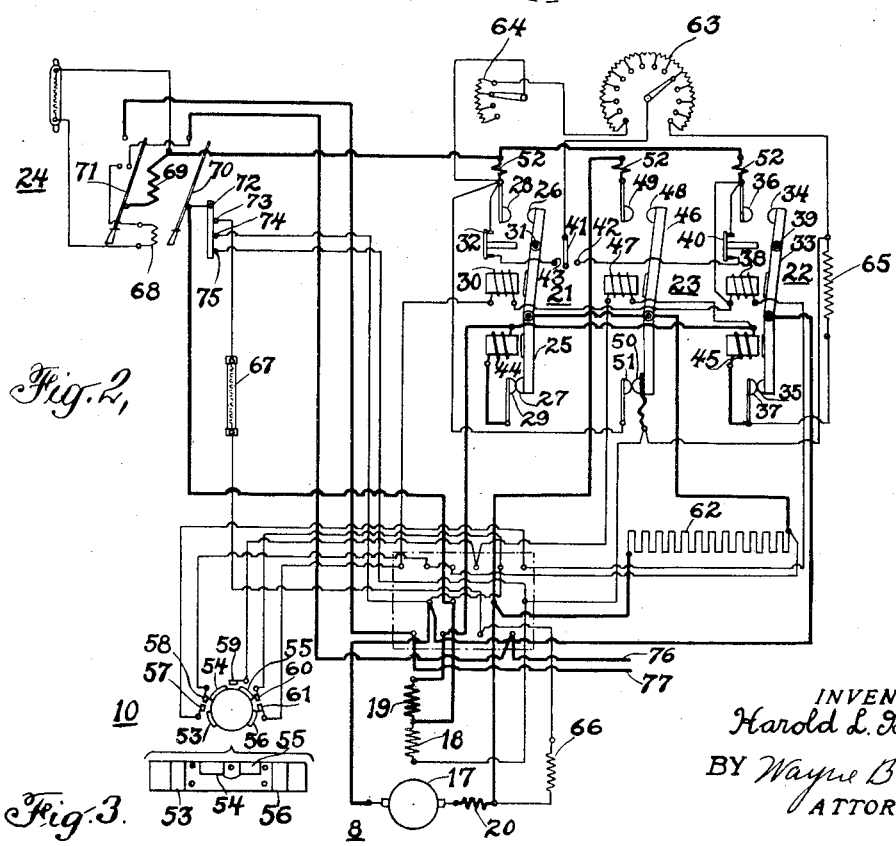
INVENTOR
Harold L. Blood
BY Wayne B Wells
ATTORNEY Patented Oct. 21, 1924.

1,512,575

UNITED STATES PATENT OFFICE.

HAROLD L. BLOOD, OF NORTH PLAINFIELD, NEW JERSEY, ASSIGNOR TO NILES-BEMENT-POND COMPANY, OF NEW YORK, N. Y., A CORPORATION OF NEW JERSEY.

PLANER CONTROL SYSTEM.

Application filed October 7, 1921, Serial No. 506,004. Renewed May 24, 1924.

*To all whom it may concern:*

Be it known that I, HAROLD L. BLOOD, a citizen of the United States, residing at North Plainfield, in the county of Somerset and State of New Jersey, have invented certain new and useful Improvements in Planer Control Systems, of which the following is a specification.

My invention relates to control system and particularly to control systems for automatically controlling the operation of planers.

One object of my invention is to provide a planer control system with switch units that shall operate a main motor in a forward and in a reverse direction and complete a dynamic-braking circuit and to provide for each switch unit a holding coil that shall be so interlocked with the contact members of the main switch units as to prevent operation of either switch unit when a dynamic-braking circuit is flowing and to prevent simultaneous operation of the two switch units.

Another object of my invention is to provide a control system for a planer, having the table thereof reciprocated by means of a motor, that shall automatically operate the motor at different speeds according to the direction of movement of the planer table and that shall be provided with a switch member for reversing the speed ratio between the forward and the reverse movement of the planer table.

A further object of my invention is to provide a planer control system having main switch units for operating the motor in a forward and in a reverse direction and for completing a dynamic-braking circuit and an accelerating switch for controlling the acceleration of the motor in a forward and in a reverse direction, the energizing coil for the accelerating switch being so connected through a pilot switch to the main switch units as to prevent energization thereof in case of arcing by the main switch units when a dynamic-braking current is flowing through the motor.

It will be understood that when I refer to a planer, I intend to include any mechanism particularly a machine tool which comprises an element (such as a work-carrying table) adapted to travel forward and backward and an element (such as a cutting tool) for operating with the table; and it will be further understood that certain obvious modifications of the invention can be applied to a metal working or other machine in which the tool in place of the table is reciprocated.

In a control system constructed in accordance with my invention, two main switch units are provided for operating the motor in a forward and in a reverse direction and also for completing a dynamic-braking circuit through the motor when the switch units are in released position. Two sets of contact members are operated by each switch unit. A main magnet is provided for operating each switch unit and the energizing circuit of each main magnet extends through one set of the contact members controlled by the opposite switch unit. Thus, before one of the switch units can be operated by the associated electro-magnet, the opposite switch unit must be in a released position. A holding magnet is provided for each switch unit and the energing circuit of each holding magnet is so extended through the contact members of the switch units as to prevent the simultaneous operation of the two switch units and also to prevent the operation of either switch unit when a dynamic-braking current is flowing through the motor.

An accelerating switch is provided for governing the acceleration of the main motor when operated either in a forward or in a reverse direction. The accelerating switch is provided with an energizing coil having one terminal thereof connected directly to the supply circuit and the other terminal thereof connected through a pilot switch to the main switch units in such manner as to prevent energization thereof in case of arcing by the main switch units when a dynamic-braking current is flowing through the motor. In certain systems now in service, the energizing coil for the accelerating switch is connected across the motor armature during dynamic-braking and means must be provided for preventing the operation of the accelerating switch during braking. Generally, the accelerating coil is short circuited through the sets of contact members which are closed when the two switch units are in the released position. However, in case an arc is formed across either of the contact members, which are closed when the main switch units are in a released position, a potential is impressed across the terminals of the coil of the accelerating switch which will operate the accelerating switch to short circuit the resistor included in the dynamic-braking circuit. In operating an electric planer, it very often happens that the last operated main switch unit tends to rebound and chatter and thus form an arc across the contact members which are closed when such switch unit is in a released position. The arc thus formed will operate the accelerating switch to short circuit the dynamic-braking resistor. In a control system constructed in accordance with my invention, the coil for operating the accelerating switch is so connected through the pilot switch to the main switch units as to prevent operation of the accelerating switch in case of arcing by the main switch units during dynamic-braking.

It is customary when operating a planer to move the planer table at a faster rate during the return stroke than during the forward or cutting stroke. However, it is convenient, at times, to effect a cutting operation on the return stroke in place of the forward stroke of the planer table. If the cutting operation were to take place during the return stroke in the control systems now in service for operating a planer, it is evident the planer table would be operating at a faster speed during the cutting operation than during the return of the table to commence a second cutting operation. In a control system constructed in accordance with my invention, a switch member is provided for reversing the speed ratio between the forward and the reverse rotation of the motor when desired.

In the accompanying drawing:

Figure 1 is a fragmentary side elevational view of a planer embodying my invention.

Fig. 2 is a diagrammatic view of the control system.

Fig. 3 is a developed view of the pilot switch.

Referring to the drawing, the bed 1 of a planer supports a work-carrying table 2 which is reciprocated longitudinally of the bed. At the sides of the bed and of the table are uprights 3, of which one only is shown in the drawing. A cross rail 4 is carried by the uprights 3 and is vertically adjustable thereon. Transversely adjustable along the cross rail 4 are one or more cross heads 5 adapted to carry cutting tools 6. A suitable mechanism, which as shown includes a separate electric motor 7, is provided for moving the cross rail 4 vertically and for adjusting the cross heads 5 thereon. The mechanical connections of the motor 7 comprise no part of the present invention and detailed description thereof is deemed unnecessary. As illustrated, these parts are similar to those shown in the Greenleaf and Keefer Patent No. 1,299,192, dated April 1, 1919, to which reference can be had for detailed information.

An electric motor 8, which is directly connected to the table 2 by means of suitable spur gearing 9, is provided for driving the reciprocating table. A pilot switch 10 is secured to the planer bed 1 for controlling the motor 8. The switch 10 is operated by adjustable dogs 11 and 12 engaging levers 13 and 14. As shown the levers 13 and 14 are connected to the pilot switch 10 by means of links 15 and 16. It will be seen that at the end of the movement of the bed 2 towards the right that is at the end of the normal cutting stroke, the dog 11 will engage the lever 13 and move the switch 10 in one direction; and at the end of the movement of the table towards the left, that is in the normal return direction, the dog 12 will engage the lever 14 and move the switch 10 in the opposite direction.

Referring to Fig. 2 of the drawing, the electric motor 8, which comprises an armature 17, a shunt field-magnet winding 18, a series field-magnet winding 19, and an interpole winding 20, is controlled by two switch units 21 and 22. The switch units 21 and 22 not only operate the motor 8 in a forward and in a reverse direction to reciprocate the work-carrying table 2 of the planer but also complete a dynamic-breaking circuit through the motor. An accelerating switch 23 is provided for governing the acceleration of the motor when it is operated in a forward and in a reverse direction. The two switch units 21 and 22 and the accelerating switch 23 are controlled by the pilot switch 10 in accordance with the movement of the work-carrying table 2. A suitable low-voltage and over-load circuit breaker 24 is provided for stopping the operation of the motor 8 in the case of low-voltage or an over-load on the motor circuit.

The switch unit 21, which serves to effect operation of the planer table in a forward or cutting direction, comprises a pivotally mounted switch arm 25 which carries two contact members 26 and 27. The contact member 26 engages a stationary contact member 28 when the switch unit is in an operative position and the contact member 27 engages a stationary contact member 29 when the switch unit is in a released position, as shown in the drawing. A main magnet 30 is provided for operating the switch arm 25. The operation of the energizing circuit for the main magnet will be described hereinafter.

A pin 31, which projects from the side of the switch arm 25, is provided for opening a switch 32 upon operation of the switch unit. When the planer is being operated to effect a cutting stroke during the forward movement of the table, the operation of the switch 32 by the pin 31 performs no change in the system. However, when the planer system is adjusted to effect a cutting operation during the return stroke or movement of the planer table towards the left, as shown in Fig. 1, the switch 32 is operated by the pin 31 to increase the resistance included in the circuit of the shunt field-magnet winding 18 and thus decrease the speed of the normal return stroke and increase the speed of the normal forward stroke.

The switch unit 22 comprises a pivotally mounted switch arm 33 carrying two contact members 34 and 35. The contact member 34 engages a stationary contact member 36 when the switch unit is in an operative position and the contact member 35 engages a stationary contact member 37 when the switch unit is in a released position, as shown in the drawing. A main magnet 38 is provided for operating the switch arm 33. The energizing circuit for the main magnet 38 is interlocked with the contact members 27 and 29 of the switch unit 21 in a manner to be hereinafter set forth. Likewise the energizing circuit for the main magnet 30 of the switch unit 21 is interlocked to the contact members 37 and 35 of the switch unit 22. A pin 39, which projects from the switch arm 33, is provided for operating a switch 40 to control the shunt field-magnet winding 18 of the motor. The switch 40 is only of service when the planer is effecting a cutting operation during the forward movement of the table 2. A switch arm 41 is adapted to be moved into engagement with the stationary contact member 42 when a cutting operation is to be effected during the forward movement of the planer table and is adapted to be moved into engagement with the stationary contact member 43 when a cutting operation is effected during the return movement of the planer table. The two switch units 21 and 22 are respectively provided with two holding coils 44 and 45 which not only serve to prevent the simultaneous operation of the two switch units but also serve to prevent the operation of either unit when a dynamic-braking current is flowing through the motor 8. The operation of such holding coils will be described hereinafter.

The accelerating switch 23 comprises a pivotally mounted switch arm 46 which is operated by a coil 47. The switch arm 46 carries a contact member 48 which is adapted to engage a stationary contact member 49 when the accelerating switch is in an operative position. The switch arm 46 carries a second contact member 50 which is insulated from the switch arm 46 and is adapted to engage a stationary contact member 51 when the accelerating switch is in the released position, as shown in the drawing.

Three blow-out coils 52 are provided for extinguishing the arcs formed by the upper sets of contact members of the main switch units 21 and 22 and the accelerating switch 23.

The pilot switch 10 comprises four contact segments 53, 54, 55 and 56 and five contact members 57 to 61 inclusive. The contact members are selectively bridged by means of the contact segments 53 to 56 inclusive. The contact members 57 and 58 are bridged by the contact segment 53 upon operation of a pilot switch by the dog 11. The bridging of the contact members 57 and 58 serve to complete an energizing circuit through the main magnet 38 of the switch unit 22. The switch unit 22 serves to operate the motor 8 to effect a return movement of the work-carrying table 2. The contact members 60 and 61, when bridged by the contact segment 56 upon operation of the pilot switch by the dog 12, serve to complete an energizing circuit through the main magnet 30 of the switch unit 21. The switch unit 21 so operates the main motor 8 as to effect movement of the planer table 2 in a forward direction. The contact members 58 and 59 are bridged by the contact segments 54 and 55 for completing an energizing circuit through the coil 47 of the accelerating switch 23 when the unit switch 21 is operated. The contact members 59 and 60 are bridged by the contact segments 54 and 55 for completing an energizing circuit for operating the accelerating switch 23 when the unit switch 22 is operated.

A resistor 62 is provided in the circuit of the motor armature 17 and two resistors 63 and 64 are provided in the circuit of the shunt field-magnet winding 18. A choke resistance 65 is also provided in the circuit of the shunt field-magnet winding 18. The motor is provided with emergency winding 66 which is connected in circuit with an emergency resistor 67 upon opening of the circuit breaker by reason of over-load or low-voltage circuit conditions.

The circuit breaker 24 embodies low-voltage coil 68 and over-load coil 69, two switch blades 70 and 71 and a switch arm 72 which serves to bridge contact members 73, 74 and 75 upon opening of the circuit breaker. The circuit breaker is connected to a supply circuit comprising conductors 76 and 77.

Assuming the circuit breaker to be closed and the planer table 2 to be at the end of the forward or normal cutting stroke, the dog 11 operates the pilot switch 10 to bridge the contact members 57 and 58 by means of the contact segment 53. The magnet 38 of the switch unit 22 is energized by a circuit which extends from the supply conductor 77 through the switch arm 71 of the circuit breaker, magnet 38, contact members 57 and 58, which are bridged by contact segment 53, switch arm 25 of the switch unit 21, contact members 27 and 29, holding coil 44, series field-magnet winding 19, and the switch blade 70 of the circuit breaker to the other supply conductor 76. The switch unit 22 is operated and a circuit is completed through the motor 8 for operating the planer table 2 in a return direction. The circuit through the motor extends from the supply conductor 77 through the switch blade 71 of the circuit breaker 24, contact members 36 and 34, switch arm 33, armature 17 of the motor 8, interpole winding 20, resistor 62, switch arm 25, contact members 27 and 29, holding coil 44 of the switch unit 21, series field-magnet winding 19 and the switch blade 70 of the circuit breaker 24 to the supply conductor 76.

The circuit through the shunt field-magnet winding 18, prior to the operation of the main switch unit 22, extends from the supply conductor 77 through the switch blade 71, contact members 51 and 50, shunt field-magnet winding 18 and the switch blade 70 to the supply conductor 76. Thus, prior to the operation of the switch unit 22, the shunt field-magnet winding is connected directly across the supply circuit without any resistance inserted in circuit with it. It is assumed during the normal operation of the planer, that is when a cutting operation is effected during the forward movement of the planer table 2, the switch arm 41 is in engagement with the contact member 42. Upon operation of the switch unit 22, the switch 40 is operated to insure the inclusion of the resistors 63 and 64 in circuit with the field-magnet winding 18 when the accelerating switch 23 is operated. The circuit through the field-magnet winding 18, upon operation of the switch unit 22 and the accelerating switch 23, extends from the supply conductors 76 through the switch blade 70, field-magnet winding 18, resistor 63, resistor 64, overload coil 69 and switch blade 71 to the supply conductor 77.

In the position of the pilot switch 10 for operating the switch unit 22, the contact segments 54 and 55 bridge the contact members 59 and 60 for energizing the coil 47 of the accelerating switch 23. The energizing circuit for the coil 47 extends from the supply conductor 77 through the switch blade 71, holding coil 69, contact members 36 and 34, switch arm 33, contact members 60 and 59, which are bridged by the contact segments 54 and 55, coil 47 of the accelerating switch, series field-magnet winding 19 and the switch blade 70 of the circuit breaker to the supply conductor 76. The accelerating switch 23 is operated to separate the contact members 51 and 50 and to effect engagement between the contact members 48 and 49. The engagement between the contact members 48 and 49 short circuits the armature resistor 62 to increase the speed of the motor. The separating of the contact members 51 and 50 opens the direct connection of the field-magnet winding 18 across the supply conductors 76 and 77. The field-magnet winding 18 is now energized in circuit with the resistors 63 and 64 through the circuit heretofore traced. Inasmuch as the resistors 63 and 64 are included in the circuit of the field-magnet winding 18, the speed of the motor is relatively high and accordingly the return stroke of the planer table 2 is effected at a relatively rapid rate.

Near the end of the return stroke, the dog 12 on the planer table operates the pilot switch 10 to a reverse position. The contact segment 53 is moved to break the connection between the contact members 57 and 58 and the contact segments 54 and 55 are moved to break the connection between the contact members 59 and 60. The contact segment 56 bridges the contact members 60 and 61 and the contact segments 54 and 55 bridge the contact members 58 and 59. When the contact segment 53 breaks the connection between the contact members 57 and 58, the energizing circuit for operating the switch unit 22 is opened. The breaking of the connection between the contact members 59 and 60 releases the accelerating switch to insert the resistor 62, in circuit with the motor armature. The releasing of the switch unit 22 completes a dynamic-braking circuit which may be traced from one terminal of the motor armature through interpole winding 20, resistor 62, switch arm 25 of the switch unit 21, contact members 27 and 29, holding coils 44 and 45, contact members 35 and 37, and switch arm 33 of the switch unit 22 to the other terminal of the motor armature. Thus the motor is quickly stopped prior to operation in a reverse direction. It should be noted that the holding coils 44 and 45 are included in the dynamic-braking circuit in order to prevent operation of either of the switch units while a dynamic-braking current is flowing.

The bridging of the contact members 60 and 61 by the contact segment 56 completes an energizing circuit through the coil 30 of the switch unit 21. The switch unit 21 is operated when the dynamic-braking current ceases to flow. The circuit through the coil 30 extends from the supply conductor 77 through the switch blade 71, holding coil 69, coil 30, contact members 60 and 61, which are bridged by the contact segment 56, contact arm 33 of the switch unit 22, contact members 35 and 37, holding coil 45, series field-magnet winding 19 and the switch blade 70 to the supply conductor 76. It should be noted the circuit through the coil 30 of the switch unit 21 extends through the contact members 35 and 37 of the switch unit 22 so that the coil 30 can only be energized when the switch unit 22 is in a released position. The switch unit 21 is operated for completing a circuit through the motor armature in a reverse direction. The circuit completed through the motor armature extends from the supply conductor 77 through the switch blade 71, over-load coil 69, contact members 28 and 26, switch arm 25, resistor 62, interpole winding 20, armature 17, switch arm 33 of the switch unit 22, contact members 35 and 37, holding coil 45, series field-magnet winding 19 and the switch blade 70 to the supply conductor 76. Thus the motor is operated in a direction to effect a forward movement of the planer table 2. The holding coil 45 is energized to prevent operation of the switch unit 22 while the switch unit 21 is in an operative position. The switch 32 is operated by the switch arm 25 but performs no function at this time inasmuch as the switch arm 41 is in engagement with the contact member 42.

The coil 47 of the accelerating switch 23 is connected across the supply conductors upon operation of the switch unit 21. The circuit through the coil 47 of the accelerating switch extends from the supply conductor 77 through the switch blade 71, overload coil 69, contact members 28 and 26, switch arm 25, contact members 58 and 59, which are bridged by the contact segments 54 and 55, coil 47, series field-magnet winding 19 and switch blade 70 to the supply conductor 76. The accelerating switch is operated to short circuit the armature resistor 62 and moreover to open the direct connection of the shunt field-magnet winding 18 across the supply conductors. The circuit through the field-magnet winding 18 extends from the supply conductor 77 through the switch blade 71, coil 69, switch 40, switch arm 41, a portion of the resistor 63, shunt field-magnet winding 18 and the switch blade 70 to the supply conductor 76. Inasmuch as only a portion of the resistor 63 is now included in circuit with the shunt field-magnet winding 18, the speed of the motor during the forward or normal cutting stroke is necessarily somewhat slower than the movement of the table during the return stroke.

It should be noted that the energizing circuit extending through the coil 47 of the accelerating magnet is not shunted across either the contact members 35 and 37 or the contact members 27 and 29 and accordingly if an arc is formed across either of the said sets of contact members when a dynamic-braking current is flowing, no operation of the accelerating switch will be effected. It very often happens that the last operated switch unit, which in this case would be the switch unit 22, rebounds and chatters when released to effect an arc across the lower set of contact members.

In case it is desired to effect a cutting operation during the return stroke of the movement of the planer table towards the left, the switch arm 41 is disconnected from the contact member 42 and is moved into engagement with the contact member 43. Thus, when the switch unit 22 is operated to effect a return movement of the planer table, the switch 40 does not insert the resistors 63 and 64 in circuit with the shunt field-magnet winding 18 inasmuch as the switch 32 now controls the shunting of the resistor 64 and a portion of the resistor 63. Accordingly the return stroke of the planer table is effected at a relatively slow rate. However, when the switch unit 21 is operated to effect a forward movement of the planer table, the switch 32 is operated to insert the resistors 63 and 64 in circuit with the field-magnet winding 18. Accordingly, the forward movement of the planer table is effected at a relatively rapid rate. The circuit breaker and the emergency circuit completed upon release of the breaker is old and well known in the art and is not considered a part of my invention. Accordingly, a detailed description thereof is deemed unnecessary.

Modifications in the system and in the arrangement and location of parts may be made within the spirit and scope of my invention and such modifications are intended to be covered by the appended claims.

What I claim is:

1. In a planer control system, the combination with a main motor, two switch units, each of said switch units having two sets of contact members for operating the motor in a forward and in a reverse direction and for completing a dynamic-braking circuit, and means operated by one of said switch units for varying the field excitation of the motor, of a main magnet for operating each of said units, the energizing circuit of each of said magnets extending through one set of the contact members of the opposite switch unit, two holding magnets respectively associated with said units, said holding magnets operating on the two units to prevent the simultaneous operation of the two units and also to prevent the operation of either unit when a dynamic-braking current is flowing.

2. In a planer control system, the combination with a main motor, two switch arms, each of said switch arms controlling two sets of contact members for operating the motor in a forward and in a reverse direction and for completing a dynamic-braking circuit, and means controlled by one of said switch arms for varying the speed of the motor when rotating in one direction, of a main magnet for operating each of said switch arms, each main magnet having an energizing circuit which extends through one set of contact members controlled by the opposite switch arm, and a holding magnet associated with each switch arm, said holding magnets operating on the switch arms to prevent the simultaneous operation of the two switch arms and also to prevent operation of either switch arm when a dynamic-braking circuit is flowing.

3. In a planer control system, the combination, with a main motor, two switch arms, each of said switch arms controlling two sets of contact members for operating the motor in a forward and in a reverse direction and for completing a dynamic-braking circuit, and means for controlling the speed of the motor in accordance with the direction of rotation thereof, of a main magnet for operating each of said switch arms, a holding magnet operating on each switch arm, each holding magnet being connected in circuit with one set of the contact members operated by the associated switch arm when such arm is in a released position, and means for reversing the speed ratio between the forward and the reverse rotation of the motor.

4. In a planer control system, the combination with a main motor, and two switch arms, each of said switch arms controlling two sets of contact members for operating the motor at different speeds in a forward and in a reverse direction and for completing a dynamic-braking circuit, of a main magnet for operating each of said switch arms, each main magnet having an energizing circuit which extends through one set of contact members controlled by the opposite switch arm, a holding magnet operating on each switch arm, each holding magnet being connected in circuit with one set of the contact members operated by the associated switch arm when such arm is in a released position, and means for reversing the speed ratio between the forward and the reverse rotation of the motor.

5. In a planer control system, the combination with a main motor, and two main switch units to connect the motor across a supply circuit for operation in a forward and in a reverse direction, of a main magnet for operating each of said switch units, a holding magnet associated with each switch unit, each of said holding magnets serving when energized to hold the associated unit in a released position, each of said holding magnets being energized when the opposite switch unit is in an operative position, and means operated by one of said switch units for varying the speed of the motor when rotating in one direction.

6. In a planer control system, the combination with a main motor, and two main switch units to connect the motor across a supply circuit for operation in a forward and in a reverse direction, of an accelerating switch for governing the acceleration of the motor when it is operated either in a forward or in a reverse direction, an energizing coil for said accelerating switch having one terminal directly connected to one side of the supply circuit and the other terminal thereof selectively connected to the other side of the supply circuit by said main switch units.

7. In a planer control system, the combination with a supply circuit, a main motor, two switch units for operating the motor in a forward and in a reverse direction and for completing a dynamic-braking circuit through it, and a pilot switch for controlling the operation of said main switch units, of an accelerating switch for controlling the acceleration of the motor in a forward and in a reverse direction, and an operating coil for said accelerating switch having one terminal thereof directly connected to one side of the supply circuit, said pilot switch serving to connect the other terminal of said coil through one of said switch units to the other side of the supply circuit.

8. In a planer control system, the combination with a supply circuit, a main motor, two main switch units for controlling the operation of said motor, and a pilot switch for controlling the main switch units to operate the motor in a forward and a reverse direction, of means comprising an accelerating switch for governing the acceleration of the motor, and an energizing coil for said accelerating switch having one terminal thereof directly connected to one side of the supply circuit, said pilot switch serving to connect the other terminal of said coil through an operated main switch unit to the other side of the supply circuit.

9. In a planer control system, the combination with a main motor, main switch units for operating the motor in a forward and in a reverse direction and for completing a dynamic-braking circuit, and a pilot switch for controlling the operation of said main switch units, of an accelerating switch automatically operated for controlling the acceleration of the motor in a forward and in a reverse direction, an operating coil for said accelerating switch, and means for so connecting said coil through the pilot switch to the main switch units as to prevent energization thereof in case of arcing by the main switch units when a dynamic-braking current is flowing through the motor.

10. In a planer control system, the combination with a supply circuit, a main motor, main switch units for operating the motor in a forward and in a reverse direction and for completing a dynamic-braking circuit, a reciprocating member operated by said motor, and a pilot switch automatically operated by said reciprocating member for controlling the operation of said main switch units, of an accelerating switch automatically operated for controlling the acceleration of the motor, an operating coil for the accelerating switch, said coil having one terminal connected to one side of the supply circuit and the other terminal so connected through the pilot switch to the main switch units as to prevent energization thereof in case of arcing by the main switch units when a dynamic-braking current is flowing through the motor.

In testimony whereof, I hereto affix my signature.

HAROLD L. BLOOD.